United States Patent
Lord et al.

(10) Patent No.: US 9,920,653 B2
(45) Date of Patent: *Mar. 20, 2018

(54) LOW PRESSURE RATIO FAN ENGINE HAVING A DIMENSIONAL RELATIONSHIP BETWEEN INLET AND FAN SIZE

(71) Applicant: United Technologies Corporation, Hartford, CT (US)

(72) Inventors: Wesley K. Lord, South Glastonbury, CT (US); Robert E. Malecki, Storrs, CT (US); Yuan J. Qiu, Glastonbury, CT (US); Becky E. Rose, Colchester, CT (US); Jonathan Gilson, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 842 days.

This patent is subject to a terminal disclaimer.

(21) Appl. No.: 13/721,095

(22) Filed: Dec. 20, 2012

(65) Prior Publication Data

US 2016/0061057 A1    Mar. 3, 2016

(51) Int. Cl.
*F01D 25/24*    (2006.01)
*F01D 5/02*    (2006.01)
(Continued)

(52) U.S. Cl.
CPC ............. *F01D 25/24* (2013.01); *F01D 5/02* (2013.01); *F01D 5/141* (2013.01); *F01D 15/12* (2013.01);
(Continued)

(58) Field of Classification Search
CPC . F01D 5/02; F01D 5/141; F01D 15/12; F01D 17/105; F01D 25/24; F02C 7/04;
(Continued)

(56) References Cited

U.S. PATENT DOCUMENTS 3,287,906 A    11/1966   McCormick
3,494,129 A *  2/1970    Krebs et al. ................. 60/226.1
(Continued)

FOREIGN PATENT DOCUMENTS

EP    0715066    12/2001
EP    1340903    9/2003
(Continued)

OTHER PUBLICATIONS

Quiet, Powered-Lift Propulsion, NASA Conference Publication 2077, conference held at Lewis Research Center, Cleveland, Ohio, Nov. 14-15, 1978; pp. 1-2; 168-180.

(Continued)

*Primary Examiner* — Jason Shanske
*Assistant Examiner* — Christopher R Legendre
(74) *Attorney, Agent, or Firm* — Carlson, Gaskey & Olds P.C.

(57) ABSTRACT

According to an example embodiment, a gas turbine engine assembly includes, among other things, a fan that has a plurality of fan blades. A diameter of the fan has a dimension D that is based on a dimension of the fan blades. Each fan blade has a leading edge. An inlet portion is situated forward of the fan. A length of the inlet portion has a dimension L between a location of the leading edge of at least some of the fan blades and a forward edge on the inlet portion. A dimensional relationship of L/D is between about 0.2 and 0.45.

20 Claims, 2 Drawing Sheets

(51) Int. Cl.
*F01D 17/10* (2006.01)
*F01D 15/12* (2006.01)
*F02K 3/06* (2006.01)
*F01D 5/14* (2006.01)
*F02C 7/04* (2006.01)

(52) U.S. Cl.
CPC .............. *F01D 17/105* (2013.01); *F02C 7/04* (2013.01); *F02K 3/06* (2013.01); F05D 2220/32 (2013.01); F05D 2250/00 (2013.01); F05D 2260/40311 (2013.01); F05D 2260/96 (2013.01); Y02T 50/671 (2013.01); Y02T 50/673 (2013.01)

(58) Field of Classification Search
CPC ... F02C 7/045; F02K 3/04; F02K 3/06; F02K 3/065; F02K 3/068; F05D 2220/36; F05D 2250/00; F05D 2260/40311; F05D 2260/96
USPC ............ 415/60, 122.1, 198.1; 416/120, 198; 244/1 N, 53 B, 130
See application file for complete search history.

(56) References Cited

U.S. PATENT DOCUMENTS

| | | | | |
|---|---|---|---|---|
| 3,532,129 | A * | 10/1970 | Morris et al. | 138/45 |
| 3,546,882 | A * | 12/1970 | Berkey | 60/204 |
| 3,843,277 | A | 10/1974 | Ehrich | |
| 3,946,830 | A * | 3/1976 | Kutney et al. | 181/214 |
| 4,209,149 | A | 6/1980 | Morris et al. | |
| 4,240,250 | A | 12/1980 | Harris | |
| 4,827,712 | A | 5/1989 | Coplin | |
| 4,927,328 | A | 5/1990 | Scoates et al. | |
| 4,934,139 | A | 6/1990 | Newton et al. | |
| 5,058,617 | A * | 10/1991 | Stockman et al. | 137/15.1 |
| 5,642,985 | A | 7/1997 | Spear et al. | |
| 5,915,403 | A * | 6/1999 | McConachie et al. | 137/15.1 |
| 5,915,917 | A | 6/1999 | Eveker et al. | |
| 5,966,525 | A * | 10/1999 | Manzi et al. | 703/8 |
| 6,071,077 | A | 6/2000 | Rowlands | |
| 6,708,711 | B2 * | 3/2004 | Surply et al. | 137/15.1 |
| 6,973,193 | B1 | 12/2005 | Tse et al. | |
| 7,374,403 | B2 * | 5/2008 | Decker et al. | 416/223 R |
| 7,797,944 | B2 | 9/2010 | Morford et al. | |
| 7,882,694 | B2 | 2/2011 | Suciu et al. | |
| 8,402,739 | B2 * | 3/2013 | Jain et al. | 60/226.1 |
| 8,418,953 | B2 * | 4/2013 | Smith et al. | 244/53 B |
| 8,449,247 | B1 | 5/2013 | Hasel et al. | |
| 8,726,632 | B2 * | 5/2014 | Morford et al. | 60/204 |
| 2004/0238687 | A1 | 12/2004 | Jones et al. | |
| 2005/0274103 | A1 * | 12/2005 | Prasad et al. | 60/226.1 |
| 2009/0003997 | A1 * | 1/2009 | Jain et al. | 415/182.1 |
| 2010/0148396 | A1 | 6/2010 | Xie et al. | |
| 2010/0162683 | A1 * | 7/2010 | Grabowski et al. | 60/226.3 |
| 2010/0218483 | A1 * | 9/2010 | Smith | 60/262 |
| 2010/0269512 | A1 | 10/2010 | Morford et al. | |
| 2010/0331139 | A1 | 12/2010 | McCune | |
| 2011/0220217 | A1 * | 9/2011 | Bensilum | B64D 27/14 137/15.1 |
| 2016/0061057 | A1 * | 3/2016 | Lord | F01D 5/141 415/122.1 |
| 2016/0108854 | A1 * | 4/2016 | Lord | F02K 3/06 415/124.1 |
| 2017/0218975 | A1 * | 8/2017 | Bintz | F02K 3/06 |

FOREIGN PATENT DOCUMENTS

| | | |
|---|---|---|
| EP | 1607603 | 12/2005 |
| GB | 1516041 | 6/1978 |
| GB | 2041090 | 9/1980 |
| GB | 2259115 | 3/1993 |
| WO | 0146944 | 6/2001 |
| WO | 2007038674 | 4/2007 |

OTHER PUBLICATIONS

International Search Report for PCT Application No. PCT/US2013/075941 dated Apr. 15, 2014.
International Search Report and Written Opinion for PCT Application No. PCT/US2014/56203, dated Oct. 9, 2014.
The International Preliminary Report on Patentability for PCT Application No. PCT/US2014/056203, dated Apr. 14, 2016.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida. pp. 145-153.
Agarwal, B.D and Broutman, L.J. (1990). Analysis and performance of fiber composites, 2nd Edition. John Wiley & Sons, Inc. New York: New York. pp. 1-30, 50-1, 56-8, 60-1, 64-71, 87-9, 324-9, 436-7.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers,108(8), 65-67.
Faghri, A. (1995). Heat pipe and science technology. Washington, D.C.: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modem Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report. NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.

(56) References Cited

OTHER PUBLICATIONS

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

European Search Report for European Patent Application No. 13864565.0 completed Dec. 16, 2015.

\* cited by examiner

LOW PRESSURE RATIO FAN ENGINE HAVING A DIMENSIONAL RELATIONSHIP BETWEEN INLET AND FAN SIZE

BACKGROUND

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors and the turbine section includes low and high pressure turbines.

A nacelle surrounds the engine. An inlet section of the nacelle is that portion of the nacelle that is forward of the fan section of the engine. One function of the inlet is to reduce noise. A minimum length of the inlet is typically required for noise reduction with high bypass ratio engines.

While longer inlets tend to improve noise reduction, that feature does not come without cost. A longer inlet is associated with increased weight and external drag. Additionally, the airflow at the inlet during takeoff typically creates a bending moment that is proportional to the length of the inlet. Longer inlets, therefore, tend to introduce additional load on the engine structure under such conditions.

SUMMARY

According to an example embodiment, a gas turbine engine assembly includes, among other things, a fan that has a plurality of fan blades. A diameter of the fan has a dimension D that is based on a dimension of the fan blades. Each fan blade has a leading edge. An inlet portion is situated forward of the fan. A length of the inlet portion has a dimension L between a location of the leading edge of at least some of the fan blades and a forward edge of the inlet portion. A dimensional relationship of L/D is between about 0.2 and 0.45.

In a further non-limiting embodiment of the foregoing gas turbine engine assembly, the engine has a high bypass ratio and the fan is a low pressure ratio fan having a pressure ratio between about 1.20 and about 1.50 at its cruise design point. The low pressure ratio fan has reduced fan source noise compared to that of conventional turbofan engines, thus the requirement for inlet length and associated acoustic liner is reduced, while still maintaining acceptable noise characteristics.

In a further non-limiting embodiment of any of the foregoing gas turbine engine assemblies, a flange is at an intermediate axial location where a nacelle inlet attaches to a forward edge of a fan case. The dimension L includes the combined length of the nacelle inlet and that portion of the fan case that is forward of the fan blade leading edge.

In a further non-limiting embodiment of any of the foregoing gas turbine engine assemblies, the ratio of L/D is between about 0.25 and 0.45.

In a further non-limiting embodiment of any of the foregoing gas turbine engine assemblies, the dimensional relationship of L/D is about 0.35.

In a further non-limiting embodiment of any of the foregoing gas turbine engine assemblies, the dimension L is different at a plurality of locations on the inlet portion. A greatest value of L corresponds to a value of L/D that is at most 0.45. A smallest value of L corresponds to a value of L/D that is at least 0.20.

In a further non-limiting embodiment of any of the foregoing gas turbine engine assemblies, the dimension L varies. The dimensional relationship of L/D is based on an average value of L.

In a further non-limiting embodiment of any of the foregoing gas turbine engine assemblies, the dimension L varies between a top of the inlet portion and a bottom of the inlet portion. The dimensional relationship of L/D is based on a value of L near a midpoint between the top and the bottom of the inlet portion.

In a further non-limiting embodiment, the axial location of the leading edge of the fan blades varies from hub to tip. The dimensional relationship of L/D is based on a value of L defined to an axial that is the average of fan hub and fan tip axial locations.

In a further non-limiting embodiment of any of the foregoing gas turbine engine assemblies, the dimension L extends along a direction that is parallel to a central axis of the engine.

In a further non-limiting embodiment of any of the foregoing gas turbine engine assemblies, the engine has a central axis. The forward edge on the inlet portion is in a first reference plane. The leading edges on the fan blades are in a second reference plane. The dimension L is measured between a first location where the central axis intersects the first reference plane and a second location where the central axis intersects the second reference plane.

The various features and advantages of at least one disclosed example embodiment will become apparent to those skilled in the art from the following detailed description. The drawings that accompany the detailed description can be briefly described as follows.

DETAILED DESCRIPTION

Figure 1:
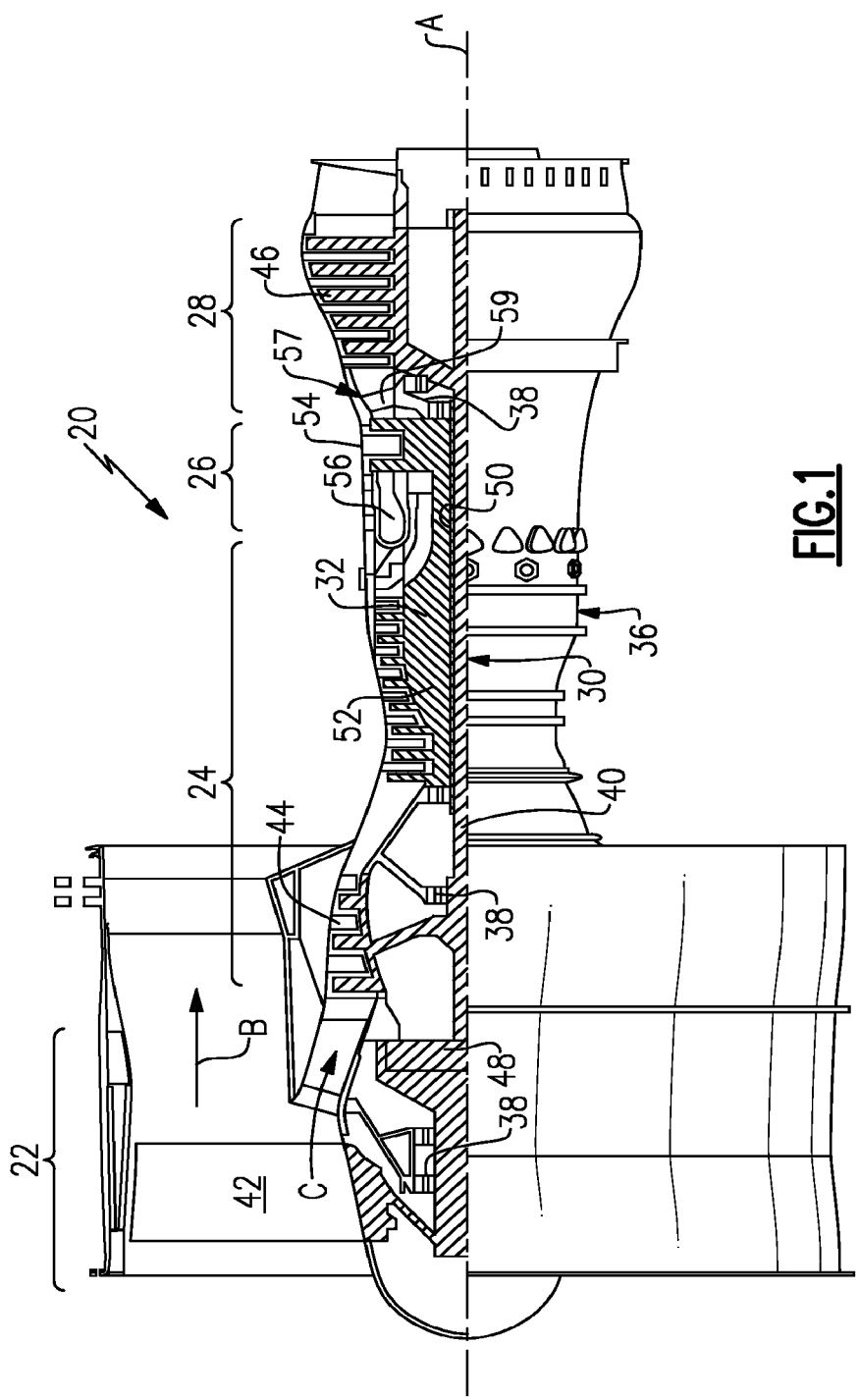
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\,°\,R)/(518.7°\,R)]^{0.5}$. The "Low corrected fan tip speed", as disclosed herein according to one non-limiting embodiment, is less than about 1150 ft/second.

Figure 2:
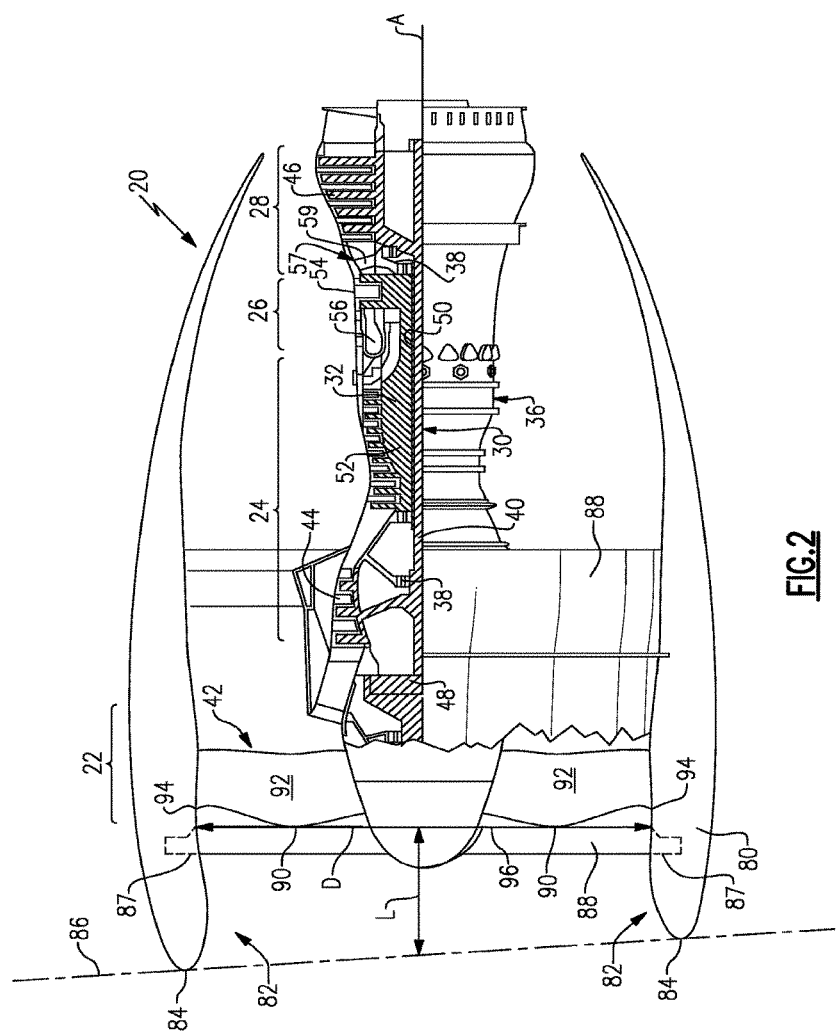
FIG. 2 schematically illustrates selected portions of the example gas turbine engine and demonstrates an example dimensional relationship designed according to an embodiment of this invention.

FIG. 2 illustrates an example embodiment of the engine 20 with a nacelle or cowling 80, that surrounds the entire engine. An inlet portion 82 is situated forward of the fan 42. In this example, the inlet portion 82 has a leading edge 84, which may be defined by the inlet side cut on the cowling 80. The leading edge 84 is generally within a first reference plane 86.

The nacelle 80 in some examples includes a flange 87 that is received against a leading edge on a fan case 88. The inlet portion 82 has a length L between a selected location corresponding to the leading edge 84, such as a location within the reference plane 86, and a forward most portion 90 on leading edges on the fan blades 92 of the fan 42. In this example, the length L may be considered an axial length of the inlet portion 82 because the length L is taken along a direction parallel to the central longitudinal axis A of the engine 20. In the illustrated example, the inlet section of the nacelle 80 and the section of the fan case 88 that is forward of the blades 92 collectively establish the overall effective length L. In other words, in this example the length L of the inlet portion 82 includes the length of the inlet section of the nacelle 80 and some of the fan case 88.

The fan blades 92 establish a diameter between circumferentially outermost edges 94. The fan diameter D is shown in FIG. 2 as a dimension extending between the edges 94 of two of the fan blades 92 that are parallel to each other and extending in opposite directions away from the central axis A. In the illustration, the forward most portions 90 on the fan blades 92 are within a second reference plane 96. In this example, the second reference plane 96 is oriented generally perpendicular to the central axis A of the engine 20. The first reference plane 86 in this example is oriented at an oblique angle relative to the second reference plane 96 and the central axis A. In the illustrated example the oblique angle of orientation of the first reference plane 86 is approximately 5°.

The length L is selected to establish a desired dimensional relationship between L and D. In some example embodiments, the dimensional relationship of L/D (e.g., the ratio of L/D) is between about 0.2 and 0.45. In some example embodiments, the dimensional relationship of L/D is between about 0.25 and 0.45. In some examples L/D is between about 0.30 and about 0.40. In some example embodiments, the dimensional relationship of L/D is about 0.35.

As can be appreciated from FIG. 2, the length L of the inlet portion 82 (i.e., the combined length of the nacelle inlet and the forward section of the fan case) is different at different locations along a perimeter of the fan case 80. The leading edge 84 is further from the second reference plane 96 near the top (according to the drawing) of the engine assembly than it is near the bottom (according to the drawing) of the engine assembly. The greatest length L in this example corresponds to a value for L/D that is no more than 0.45. The smallest length L in the illustrated example corresponds to a value for L/D that is at least 0.20. The value of L/D may vary between those two limits at different locations on the leading edge 84.

In one example where the leading edge 84 has a variable distance from the second reference plane 96, the dimensional relationship L/D is taken based upon a measurement of L that corresponds to an average measurement of the dimension between the leading edge 84 of the inlet portion 82 and the average location of the leading edge on the fan blades 92. Stated another way, L/D in such an embodiment is based on a measurement of the average distance between the reference planes 86 and 96. In another example where the dimension between the first reference plane 86 and the second reference plane 96 varies, the dimension L used for the dimensional relationship L/D is taken at a midpoint between a portion of the leading edge 84 that is most forward and another portion of the leading edge 84 that is most aft.

In another example, the dimension L is measured between a first location where the central longitudinal axis A of the engine intersects the first reference plane 86 and a second location where the axis A intersects the second reference plane 96.

The dimensional relationship of L/D is smaller than that found on typical gas turbine engines. The corresponding dimensional relationship on most gas turbine engines is greater than 0.5. Providing a shorter inlet portion length L facilitates reducing the weight of the engine assembly. A shorter inlet portion length also reduces the overall length of the nacelle and reduces external drag. Additionally, having a shorter inlet portion 82 reduces the bending moment and corresponding load on the engine structure during flight conditions, such as takeoff. A shorter inlet portion 82 also can contribute to providing more clearance with respect to cargo doors and other mechanical components in the vicinity of the engine.

The example engine 20 is a high bypass ratio engine having a larger fan with respect to the engine core components and lower exhaust stream velocities compared to engines with lower bypass ratios. Higher bypass ratio engines tend to have fan noise as a more significant source of noise compared to other sources. The illustrated example includes a shorter inlet yet does not have an associated effective perceived noise level that is noticeably greater than other configurations with longer inlets. One reason for this is that the example engine 20 includes a low pressure ratio fan that operates at a slower fan speed, which is associated with less fan noise. In one example, the fan 42 has a pressure ratio between about 1.20 and about 1.50. A pressure ratio within that range corresponds to the engine operating at a cruise design point in some example implementations. The shorter length L of the inlet portion 82 combined with the low pressure ratio of the fan 42, which has a slower fan speed enabled by the geared architecture of the engine 20, results in an acceptable perceived engine noise level.

Utilizing a dimensional relationship as described above allows for realizing a relatively shorter inlet on a gas turbine engine while maintaining sufficient noise attenuation control. Additionally, the short inlet portion 82 combined with the low pressure ratio fan 42 provides improved propulsive efficiency and lower installed fuel burn compared to conventional gas turbine engine propulsion systems.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

We claim:

1. A gas turbine engine assembly, comprising:
a fan including a plurality of fan blades, a diameter of the fan having a dimension D that is based on a dimension of the fan blades, each fan blade having a leading edge, the fan being configured to deliver a portion of air into a compressor section and a portion of air into a bypass duct, wherein a bypass ratio is greater than 6, the bypass ratio being a ratio of a volume of air passing to the bypass duct compared to a volume of air passing into the compressor section; and
an inlet portion forward of the fan, a length of the inlet portion having a dimension L between a location of the leading edge of at least some of the fan blades and a forward edge on the inlet portion,
wherein a dimensional relationship of L/D is between 0.2 and 0.45.

2. The assembly of claim 1, wherein the dimensional relationship of L/D is between 0.25 and 0.45.

3. The assembly of claim 2, wherein the dimensional relationship of L/D is between 0.30 and 0.40.

4. The assembly of claim 2, wherein the dimensional relationship of L/D is 0.35.

5. The assembly of claim 1, wherein
the dimension L is different at a plurality of locations on the inlet portion;
a greatest value of L corresponds to a value of L/D that is at most 0.45; and
a smallest value of L corresponds to a value of L/D that is at least 0.20.

6. The assembly of claim 1, wherein
the dimension L varies; and
the dimensional relationship of L/D is based on an average value of L.

7. The assembly of claim 1, wherein
the dimension L varies between a top of the inlet portion and a bottom of the inlet portion; and
the dimensional relationship of L/D is based on a value of L near a midpoint between the top and the bottom of the inlet portion.

8. The assembly of claim 1, wherein
the leading edges of the fan blades are in a reference plane; and
the dimension L extends along a direction that is perpendicular to the reference plane.

9. The assembly of claim 8, wherein
the engine assembly has a central axis;
the reference plane is perpendicular to the central axis; and
the dimension L extends along a direction that is parallel to the central axis.

10. The assembly of claim 1, wherein
the engine assembly has a central axis;
the forward edge on the inlet portion is in a first reference plane;
the leading edges of the fan blades are in a second reference plane; and
the dimension L is measured between a first location where the central axis intersects the first reference plane and a second location where the central axis intersects the second reference plane.

11. The assembly of claim 1, wherein
the fan is a low pressure ratio fan having a pressure ratio between 1.20 and 1.50.

12. The assembly of claim 11, wherein the bypass ratio is greater than 10.

13. The assembly of claim 1, wherein
the fan is a low pressure ratio fan having a pressure ratio less than 1.50.

14. The assembly of claim 13, comprising
a geared architecture configured to drive the fan at a speed that is less than an input speed in the geared architecture, the geared architecture defining a gear reduction ratio greater than or equal to 2.3.

15. A gas turbine engine assembly, comprising:
a fan including a plurality of fan blades, a diameter of the fan having a dimension D that is based on a dimension of the fan blades, each fan blade having a leading edge;
a geared architecture configured to drive the fan at a speed that is less than an input speed in the geared architecture;
a turbine section configured to drive the geared architecture;
an inlet portion forward of the fan, a length of the inlet portion having a dimension L between a location of the leading edge of at least some of the fan blades and a forward edge on the inlet portion; and
wherein a dimensional relationship of L/D is no more than 0.45.

16. The gas turbine engine assembly of claim 15, wherein
the fan is a low pressure ratio fan having a pressure ratio less than 1.45.

17. The gas turbine engine assembly of claim 15, wherein
the fan is configured to deliver a portion of air into a compressor section and a portion of air into a bypass duct;
a bypass ratio which is defined as a volume of air passing to the bypass duct compared to a volume of air passing into the compressor section being greater than or equal to 10.

18. The gas turbine engine assembly of claim 15, wherein a dimensional relationship of L/D is at least 0.20.

19. The gas turbine engine assembly of claim 18, wherein the dimensional relationship of L/D is between 0.30 and 0.40.

20. The gas turbine engine assembly of claim 15, wherein the geared architecture defines a gear reduction ratio greater than or equal to 2.3.

\* \* \* \* \*

Disclaimer

9,920,653 B2 - Wesley K. Lord, South Glastonbury, CT (US); Robert E. Malecki, Storrs, CT (US); Yuan J. Qiu, Glastonbury, CT (US); Becky E. Rose, Colchester, CT (US); Jonathan Gilson, West Hartford, CT (US). LOW PRESSURE RATIO FAN ENGINE HAVING A DIMENSIONAL RELATIONSHIP BETWEEN INLET AND FAN SIZE. Patent dated March 20, 2018. Disclaimer filed November 25, 2019, by the assignee, United Technologies Corporation.

Hereby enters this disclaimer to the complete claims 1-20 of said patent.

*(Official Gazette, May 25, 2021)*